United States Patent
Ayme de la Chevreliere

[11] 3,905,551
[45] Sept. 16, 1975

[54] AUTOMATIC SOIL-SPRINKLING ARRANGEMENTS

[76] Inventor: Charles Ayme de la Chevreliere, 21 Avenue de Madrid, Neuilly-sur-Seine (Hauts-de-Seine), France

[22] Filed: Mar. 18, 1968

[21] Appl. No.: 713,645

[30] Foreign Application Priority Data
Mar. 20, 1967 France .............................. 67.99429

[52] U.S. Cl. .................................................. 239/63
[51] Int. Cl. ...................... A01q 21/18; A01q 27/00
[58] Field of Search ........ 307/116, 118; 239/63, 64; 137/78

[56] References Cited
UNITED STATES PATENTS
2,768,028  10/1956  Robinson ............................. 239/64
3,195,816  7/1965  Mercer ................................. 239/63
3,224,676  12/1965  Rauchwerger ....................... 239/64

FOREIGN PATENTS OR APPLICATIONS
1,177,789  12/1958  France ................................. 239/63

Primary Examiner—Lloyd L. King

[57] ABSTRACT

An arrangement for controlling the operation of a ground-moistening sprinkler comprising an electrode lying within the upper actually sprinkled layer and an electrode lying within the permanently moist layer at a sufficient depth. The resistivity of the soil including the generally dry section between the two layers shows the degree of moisture in said section and forms a criterion releasing the operation of the sprinkler. To obtain a sufficiently true average, the electrodes are also spaced horizontally.

2 Claims, 3 Drawing Figures

PATENTED SEP 16 1975　　3,905,551

INVENTOR:
Charles AYME DE LA CHEVRELIERE
by: Arthur O. Klein, his Attorney

AUTOMATIC SOIL-SPRINKLING ARRANGEMENTS

My invention has for its object improved automatic soil-sprinkling arrangements.

It is well-known in the art to initiate the operation of one or more sprinklers by means of a clockwork starting the sprinkling at predetermined time intervals or else by resorting to a daylight-sensitive mechanism, or again to a mechanism controlled by the height of the sun above the horizon, but none of such prior arrangements is entirely satisfactory since it cannot take into account the essential parameters constituted by the moisture of the soil. The primary object of the sprinkling being obviously that of watering the soil, it is necessary to release the sprinkling only when the earth has become dry.

It has already been proposed, in order to take into account said moisture of the soil, to initiate the operation of a sprinkler through the agency of a moisture-measuring apparatus constituted by two electrodes engaging the soil, the two electrodes being adapted to measure the electric resistivity of the horizontal ground layer extending between said electrodes. However, such an apparatus has not proved satisfactory. As a matter of fact, the superficial layer of the soil, of which the resistivity is thus measured, dries at a comparatively speedy rate in summer and it would be necessary to sprinkle it often in order to keep it in a suitable condition of moisture, whereas the underlying layer located at a greater depth is laden with moisture by reason of said greater depth.

It has also been proposed to use gypsum blocks serving as sounding rods by reason of the excellent hygroscopic properties of gypsum and also of its resistance against erosion, such blocks carrying cooperating graphite electrodes. However, the last-mentioned sounding rods are not applicable in the case of an automatic sprinkling since they allow only a local analysis of the soil, which may lead to objectionable results in operation as a consequence of the heterogeneous rate of propagation of water in the soil, which heterogeneous rate is in its turn ascribable to local modifications in the structure of the ground. My invention has for its object to become independent of local measurement of moisture supplied by sounding rods of such a type and to cut out the drawbacks arising therethrough.

My invention has therefore for its object an arrangement controlling the sprinkling operation and comprising two electrodes measuring the electric resistivity and consequently the moisture of the ground, the novelty of the invention consisting in that the two electrodes are laid at different depths and are preferably spaced in a transverse direction, the upper electrode extending in the layer of soil adapted to be moistened by surface sprinkling while the lower electrode lies at a greater depth within the layer of soil carrying a residual moisture in a manner such that the operation of the sprinkler is controlled and continued until the layer of the soil moistened by the sprinkling sinks down to the layer carrying a residual moisture and enclosing the deeper electrode, which allows restoring continuity of the hygrometric condition of the soil.

By way of example and with a view to furthering the understanding of my invention, I have illustrated said invention in the accompanying drawing wherein.

Figure 1:
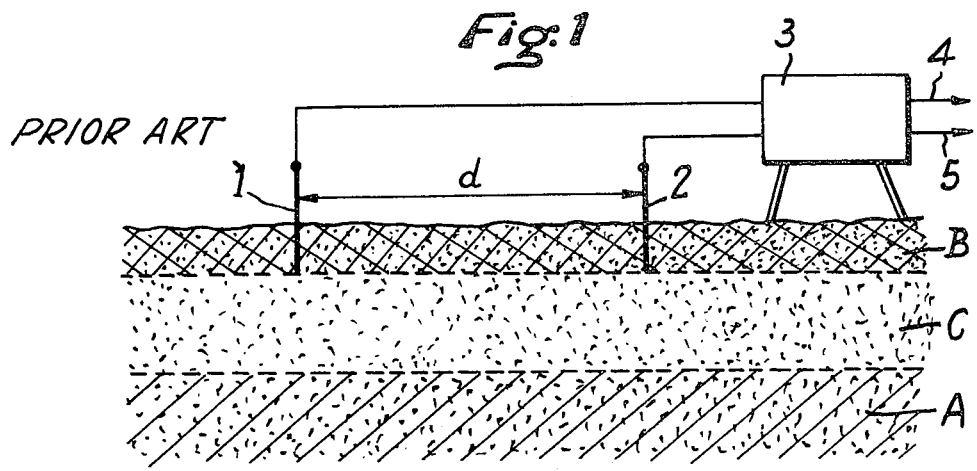
FIG. 1 is a diagrammatic sectional view of a known arrangement.

Turning to FIG. 1 illustrating an arrangement of a known type, two electrodes 1 and 2 are laid in the ground at a predetermined distance $d$ from each other. When the layer of soil extending between said two electrodes 1 and 2 is dry, no electric current or only a very weak current can pass and the casing 3 which encloses the means controlling the sprinkler and to which said two electrodes are connected transmits through the leads 4 and 5 a signal to a sprinkler which is not illustrated.

The results obtained with such an apparatus are not satisfactory since the electrode-controlled circuit causes the sprinkling to stop as soon as the uppermost layer of earth B inside which said electrodes are inserted is sufficiently moist, and there remains a layer of dry earth C between said sprinkled layer B and the deep layer A which remains constantly moist in countries having a moist climate.

Said deep layer A retains a large amount of moisture which cannot rise since the layer C forms a screen and it is necessary to constantly sprinkle it so as to supply the plants with a sufficient moisture.

My invention has for its object to cut out said intermediate layer C and to set the upper and lower layers A and B in contacting relationship, the moisture collected in the layer A rising then through a capillary effect into the upper layer B which becomes therefore dry at a much slower rate. When the soil becomes dry and the upper level of the layer A sinks, the sprinkling is started again.

This allows resorting to the moisture lying at a certain depth in the soil and leads thereby to a great saving in the sprinkling, which is of considerable interest since the sprinkling is an expensive operation.

According to my invention, the electrodes are arranged depthwise in staggered relationship. The upper electrode 6 (FIG. 2) lies in a horizontal plane at about 5 and 6 cm. underneath ground level, while the lower electrode 7 lies lower than the level in which the roots of the plant extend that is at a depth sufficient for said electrodes to be embedded in the permanently moist layer A, the moisture of which is provided by a preliminary natural or artificial irrigation.

The electrodes 6 and 7 control the sprinkling until the layers A and B meet, which allows the moisture in the layer A to rise towards the plants while the layer B remains moist for a much longer time.

The electrodes may advantageously be constituted by small rods made of porous graphite, the use of graphite cutting out the formation of a layer of oxide, which would modify the electric properties of the electrode and doing away with all other phenomena ascribable to corrosion. Furthermore, the fact that graphite is porous allows the moisture to enter the mass of the electrodes and there is consequently a hygrometric continuity between the soil and the electrodes.

When the superficial layer becomes dry, the electrode or sounding rod 6 is insulated and the sprinkling operation is released. If a dry area appears between the sounding rods 6 and 7 as a consequence of the suction exerted by the plants, the sprinkling operation is also released until the lower level of the layer of earth which has become moist through sprinkling sinks down to the upper level of the lower layer carrying the latent moisture of the ground.

Tests have shown that a vertical heterogeneity may exist in the soil, for instance that constituted by a crevice in registry with the electrodes, which heterogeneity leads to a defective operation. In order to cut out such a drawback, it is preferable to lay the electrode 6 somewhat out of vertical alignment with the electrode 7 and to shift the electrodes horizontally apart by a sufficient amount, so that the sample of soil extending between the two electrodes may form a representative sample illustrating the nature of the soil.

Figure 3:
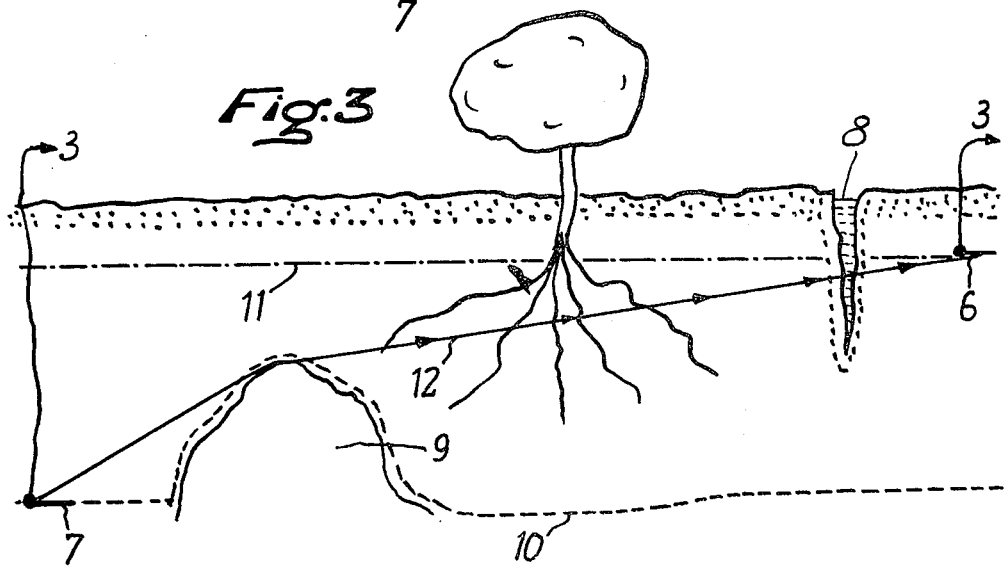
FIG. 3 illustrates diagrammatically a practical application of my improved arrangement.

Turning to FIG. 3, it is apparent that the electrode 6 is spaced horizontally away from the electrode 7. The vertical cross-section of the ground shows a crevice at 8 and a concealed rock at 9. The dot-and-dash line 11 designates the plane defining the lower limit of superficial dryness produced by evaporation. The dotted line 10 illustrates the lowermost level of water at the end of the sprinkling operation. The average path of the electric current between the two electrodes is illustrated symbolically by the arrow-carrying line 12. In the case illustrated of a heterogeneous ground, the electric current passes round the insulating rock 9 and directly across the crevice 8 which is highly conductive since it is full of water. The apparent resistance between the electrodes 6 and 7 is neither that of the impervious rock, which is very high nor the very low resistance of the crevice, but that of the tilth to be sprinkled and which extends between the electrodes. Such a resistance can be measured only by an arrangement including two electrodes at a somewhat important distance from each other both vertically and horizontally.

Figure 2:
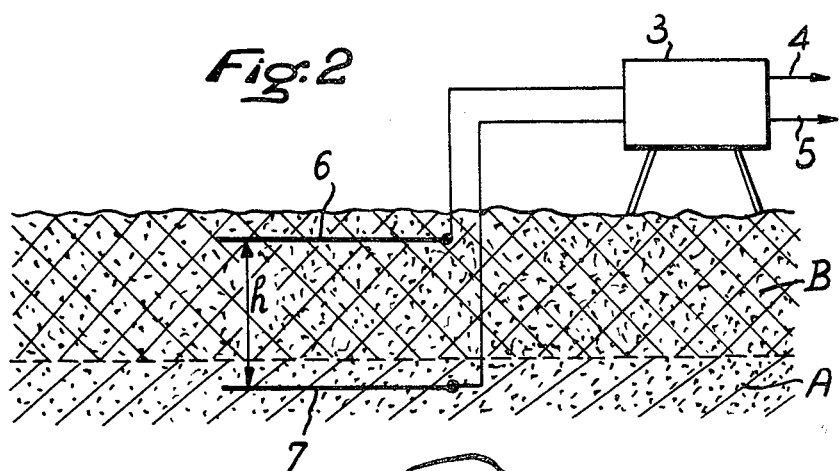
FIG. 2 is a similar view of an arrangement according to my invention.

In the case where the two electrodes are located above each other as illustrated in FIG. 2, it may occur that they lie both in the same crevice 8 of the ground for instance and for this reason it is preferable to locate the electrodes at a distance from each other as described.

The sprinkling control obtained by the arrangement according to my invention can advantageously be associated with an apparatus including a photo-cell for instance, while allows controlling the sprinkling at moments which do not coincide with the hot periods of the day or else with any other apparatus preventing the sprinkling during such transient hot periods.

What I claim is:

1. A soil moistening system, comprising in combination, a first isolated electrode, in an upper layer of the soil which is adapted to be moistened, a second isolated electrode in a lower layer of the soil which incorporated a permanent residual moisture, means for measuring the electrical resistivity of the soil between said electrodes and thereby the moisture content of the soil including circuit means connecting said electrodes to a source of electric power whereby to pass electric current from one electrode to the other through the soil between the electrodes, said means being operatively connected to the actuating means of a sprinkler system and being adapted to activate said sprinkler system until the moisture in said upper layer has sunk sufficiently for it to reach the upper surface of the lower soil layer which incorporates permanent residual moisture, said first and second electrodes being substantially spaced from each other in a horizontal direction.

2. A soil moisture detecting system, comprising in combination, a first isolated electrode in an upper layer of the soil which is adapted to be moistened, a second isolated electrode in a lower layer of the soil which incorporates a permanent moisture, a source of electric power, circuit means connecting said power source to said electrodes thereby causing an electric current to flow from one electrode to the other through the soil disposed therebetween, means for measuring the electrical resistivity of the soil between said electrodes thereby measuring the moisture content of the soil, said first and second electrodes being substantially spaced from each other in a horizontal direction.

* * * * *